United States Patent

[11] 3,623,752

| [72] | Inventor | James O. Brown<br>Fullerton, Calif. |
|---|---|---|
| [21] | Appl. No. | 886,465 |
| [22] | Filed | Dec. 19, 1969 |
| [45] | Patented | Nov. 30, 1971 |
| [73] | Assignee | DeLaval Turbine California Inc.<br>Trenton, N.J. |

[54] SELF-LOCKING PIPE ADAPTER
1 Claim, 5 Drawing Figs.

[52] U.S. Cl. .................................................. 285/91,
285/305, 285/330, 285/12, 251/148
[51] Int. Cl. ....................................................... F16l 21/08,
F16l 25/00, F16l 29/00
[50] Field of Search ........................................... 251/148,
151; 137/269, 271; 285/12, 177, 305, 330, 91

[56] References Cited
UNITED STATES PATENTS
2,095,914 10/1937 Blown ........................ 285/305 X 2,855,177 10/1958 Fleeman ........................ 285/305 X
FOREIGN PATENTS
1,030,984 5/1966 Great Britain ............... 285/305

*Primary Examiner*—William R. Cline
*Attorney*—Harris, Kiech, Russell & Kern

ABSTRACT: An internally threaded adapter fitting for connecting a pipe, or the like, to a body to place the pipe in fluid communication with a passage in the body. The fitting is disposed in bore terminating in the fluid passage. The fitting is held against axial movement in the bore and is also held against rotation in the bore so that a pipe can be threaded into the fitting, or unscrewed therefrom. With this construction, fittings have different internal threads can be secured in the bore to accommodate different pipe threads. Consequently, it is not necessary to manufacture and stock bodies threaded to match different pipe threads, it being necessary only to manufacture and stock one body and fittings having different threads.

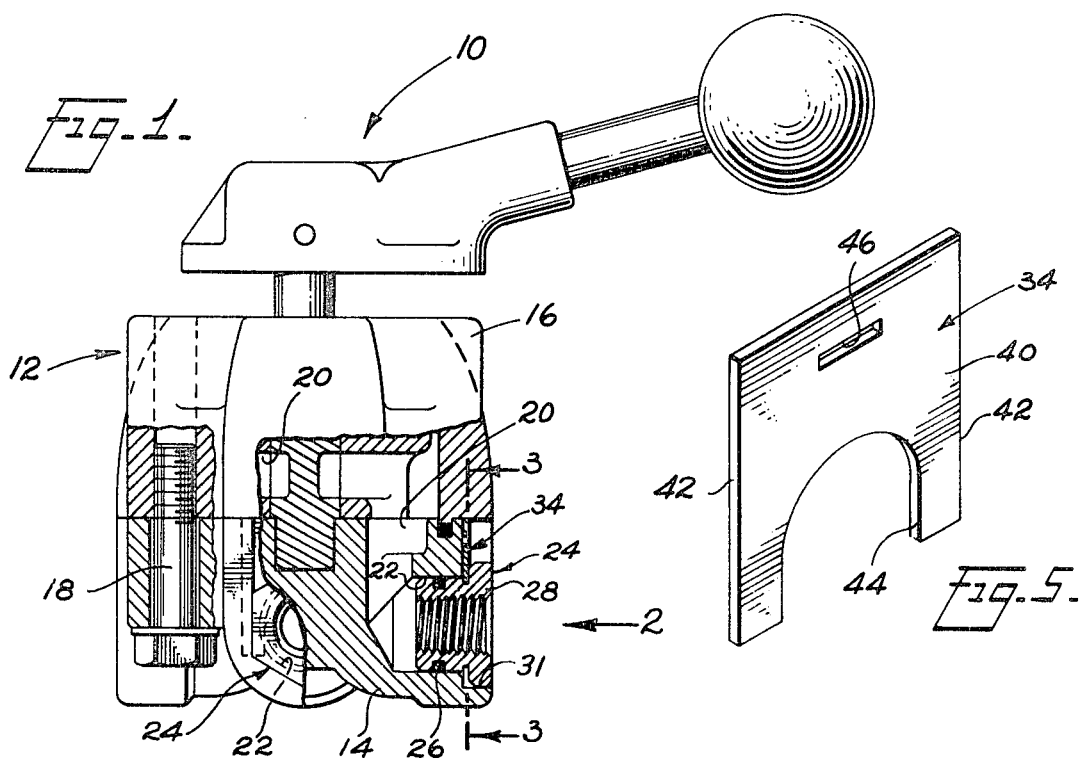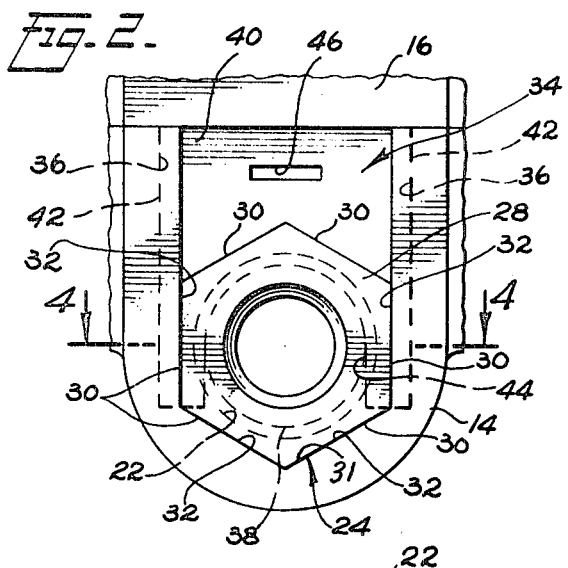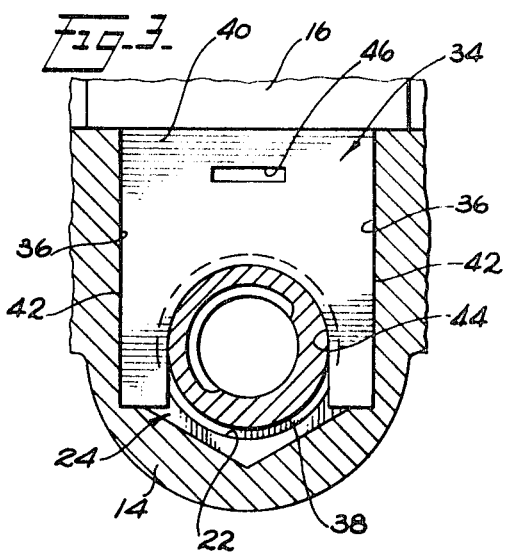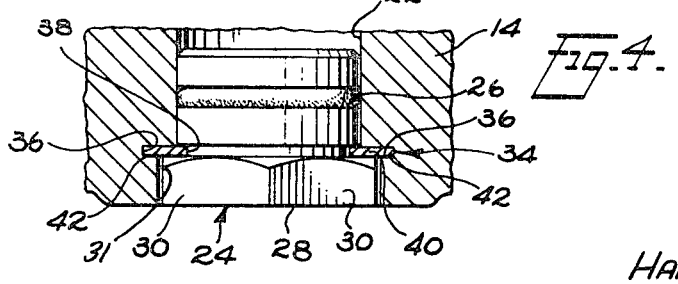

SELF-LOCKING PIPE ADAPTER

BACKGROUND OF INVENTION

The present invention relates in general to threadedly connecting pipes, or the like, to various devices, such as valves, having passages therein, with the pipes in fluid communication with the passages.

Conventionally, valves, or other devices having fluid passages, are provided with internally threaded ports which communicate with such passages and into which pipes, or the like, are threaded directly. With the wide variety of different pipe threads currently in use in the United States and other countries, bodies to which pipes are to be threadedly connected must be manufactured and stocked with different threaded ports matching the various pipe threads such ports must accommodate. This situation creates serious and expensive manufacturing and inventory problems.

SUMMARY AND OBJECTS OF INVENTION

In the light of the foregoing background, the primary object of the invention is to provide fluid devices capable of having secured thereto any of a plurality of differently threaded adapter fittings respectively corresponding to different pipe threads. With this construction, each such device may be used with any of a number of different pipe threads merely by installing the proper adapter fitting, thereby reducing manufacturing and inventory expense, which is an important feature of the invention.

More particularly, an important object of the invention is to provide a fluid device comprising a housing which includes a body having a bore extending thereinto and terminating in a fluid passage, an internally threaded tubular fitting in the bore, means for preventing rotation of the fitting in the bore, and means for preventing axial movement of the fitting in the bore. Thus, a correspondingly threaded pipe may be threaded into, or unscrewed from, the fitting without any displacement thereof relative to the body.

Another object of the invention is to prevent rotation of the fitting in the bore by providing the body and the fitting with complementary, interengaged noncircular surfaces. A related object is to provide the body and the fitting with complementary and interengaged surfaces which are angularly spaced and flat. Preferably, the fitting is provided at its outer end with a hexagonal head and the body is provided adjacent the outer end of the bore for the fitting with angularly spaced, flat surfaces respectively complementary to and engaged by at least some of the flat surfaces on the hexagonal head.

Another important object of the invention is to provide key means insertable into keyways in the body and the fitting, adjacent the outer ends of the bore and the fitting, for preventing axial movement of the fitting in the bore. A related object is to provide a horseshoe-shaped key insertable into laterally inwardly facing keyways in the body and a complementary, external, annular, laterally outwardly facing keyway in the fitting, such keyway in the fitting being located behind the hexagonal head thereon.

A further object of the invention is to provide a housing which includes another member secured to the body and engaging the key to retain the key in its keyways automatically upon assembly of the two parts of the housing. With this construction, the fitting is locked in place in such a way that it cannot be removed without disassembly of the housing, which is an important feature.

The foregoing objects, advantages, features and results of the present invention, together with various other objects, advantages, features and results of the invention which will be evident to those skilled in the art to which the invention relates in the light of this disclosure, may be achieved with the exemplary embodiment of the invention illustrated in the accompanying drawing and described in detail hereinafter.

DESCRIPTION OF DRAWING

In the drawing:

FIG. 1 is a view, partially in elevation and partially in section, of a valve which embodies the invention;

FIG. 2 is an enlarged, fragmentary elevational view taken as indicated by the arrow 2 of FIG. 1;

FIG. 3 is an enlarged, fragmentary sectional view taken as indicated by the arrowed line 3—3 of FIG. 1;

FIG. 4 is a fragmentary sectional view taken as indicated by the arrowed line 4—4 of FIG. 2; and FIG. 5 is an enlarged isometric view of a horseshoe-shaped key forming part of the invention.

DESCRIPTION OF EXEMPLARY EMBODIMENT OF INVENTION

The invention is shown in FIG. 1 of the drawing, for purposes of illustration, as incorporated in a rotary valve 10 of the type disclosed in U.S. Pat. No. 3,014,499, issued Dec. 26, 1961 to Lilburn S. Barksdale. The valve 10 comprises a two-part housing 12 which includes a body or body member 14 and a second member 16 secured together by bolts 18 only one of which is visible.

The housing 12 is provided therein with fluid passages 20 terminating at their outer ends in circumferentially spaced, radial bores 22 in the body 14. Normally, as shown in the aforementioned Barksdale patent, these bores 22 would be internally threaded ports to receive pipes, or the like, not shown.

In accordance with the present invention, each bore 22 has inserted thereinto an internally threaded tubular adapter fitting 24 the threads of which conform to the particular pipe thread to be accommodated. A cylindrical portion of the fitting 24 is provided therein with an external annular groove for an O-ring 26 which engages the wall of the corresponding bore 22 to provide a fluidtight seal.

The fitting 24 is provided at its outer end with a head 28, shown as hexagonal, having angularly spaced flat surfaces 30, six in number in the case of a hexagonal configuration. The body 14 is provided adjacent the outer end of the corresponding bore 22 with 31 which receives the hexagonal head 28 and which provides and complementary, angularly spaced, flat surfaces 32 paralleling the common axis of the bore and the fitting and respectively engaged by certain of the surfaces 30 of the hexagonal head 28. In the particular construction illustrated, the body 14 is provided with four of the angularly spaced, flat surfaces 32 which are respectively engaged by four corresponding ones of the angularly spaced, flat surfaces 30 on the head 28 of the fitting 24. With this construction, the fitting 24 is securely held against rotation as a pipe, not shown, is threaded thereinto, or is unscrewed therefrom.

To prevent axial movement of the fitting 24 in its bore 22, the invention provides a key means 34 disposed in complementary keyways in the body 14 and the fitting. More particularly, the body 14 is provided adjacent the outer end of the bore the inner end of the recess 31, with two keyways 36 on opposite sides of and facing laterally inwardly toward the outer end of the bore. The keyways 36 extend to the interface between the body 14 and the member 16. The fitting 24 is provided therein with an outwardly facing, external annular keyway 38 behind the hexagonal head 28 and registering with the keyways 36 in the body 14.

The fitting 24 is restrained against axial movement in its bore 22 by a generally horseshoe-shaped key 40 in the keyways 36 and 38. More particularly, the key 40 has straight edges 42 in the keyways 36 and has a horseshoe-shaped edge 44 in the keyway 38.

As will be apparent, the fitting 24 is inserted into the corresponding bore 22 prior to assembly of the body 14 and the member 16. The fitting 24 may be inserted in any of a plurality of positions angularly spaced 60° apart with the particular hexagonal construction shown, and will be prevented from rotating by the interengaged surfaces 30 and 32. After the fitting 24 has been inserted in its bore 22, the key 40 is inserted into the keyways 36 and 38. Thereafter, the body 14 and the member 16 are interconnected by the bolts 18, whereupon the member 16 engages the key 40 to hold it in the keyways 36 and 38. The key 40 may be provided with a slot 46 therein for a screwdriver, not shown, when removal of the key is desired.

It will be apparent from the foregoing that the valve 10 may readily be equipped with a set of fittings 24 each adapted to accommodate a particular pipe thread, which may be the same or different for the various fittings, although it normally will be the same for a particular installation. If it is ever necessary to use the valve 10 with a different-type thread or threads, correspondingly differently threaded fittings 24 may be substituted readily.

Thus, it is unnecessary with the present invention to manufacture and stock a plurality of different valves 10 for different pipe threads. Instead, it is necessary to manufacture and stock only a single valve 10, and differently threaded fittings 24 corresponding to the pipe threads to be accommodated.

Although an exemplary embodiment of the invention has been disclosed herein for purposes of illustration, it will be understood that the various changes, modifications and substitutions may be incorporated in such embodiment without departing from the spirit of the invention.

I claim as my invention:

1. A fluid handling apparatus having means for connecting thereto pipes, or the like, having different pipe threads, including:
   a. a housing including a body having a bore extending thereinto and terminating in a fluid passage;
   b. said body being provided at the axially outer end of said bore with a recess bounded by angularly spaced flat surfaces paralleling the axis of said bore;
   c. said body being provided at the junction of said bore and said recess with two parallel keyways on opposite sides of and facing laterally inwardly toward he axis of said bore;
   d. a tubular adapter fitting in said bore and threaded internally to accommodate a pipe, or the like, having a particular pipe thread;
   e. said fitting being provided at its axially outer end with a head disposed within said recess;
   f. said head having angularly spaced flat surfaces paralleling the axis of said fitting and complementary to and engaging said angularly spaced flat surfaces of said recess, thereby preventing rotation of said fitting in said bore;
   g. said fitting having adjacent and axially inwardly of said head an external annular keyway facing outwardly away from the axis of said fitting and registering with said keyways in said body;
   h. a flat, horseshoe-shaped key in said keyway in said fitting and in said keyways in said body to prevent axial withdrawal of said fitting from said bore;
   i. said housing including another member secured to said body and engaging said key to retain it in said keyways; and
   j. means providing a fluidtight seal between said fitting and said body.

* * * * *